(No Model.)
W. B. PADGETT & W. J. BROCK.
WAGON BRAKE.
No. 252,505. Patented Jan. 17, 1882.
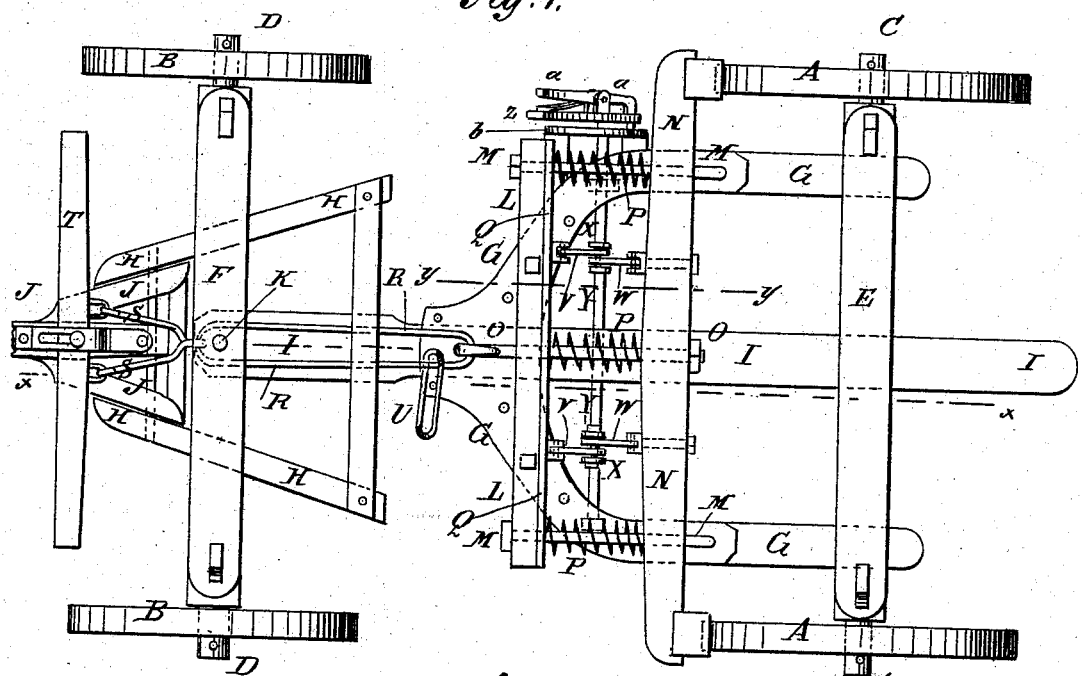
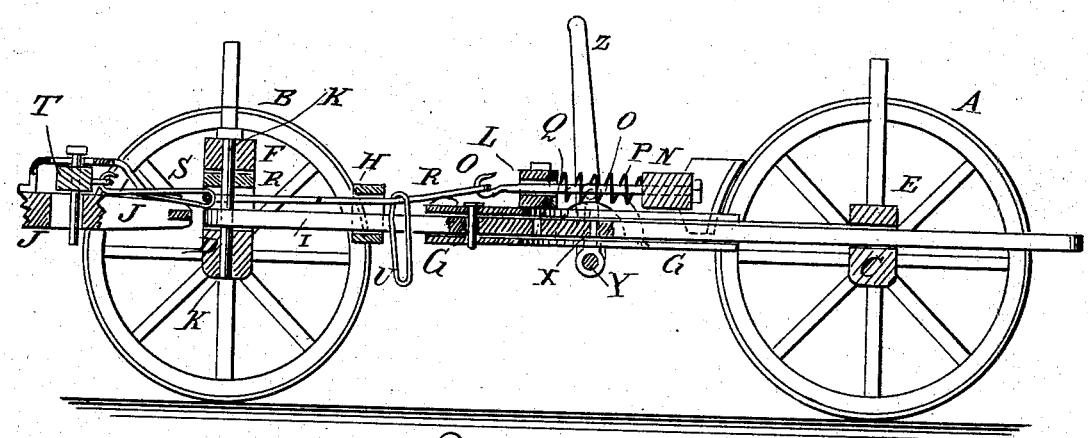
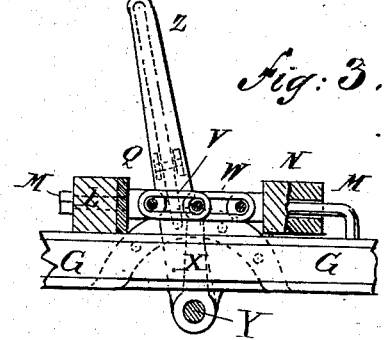
WITNESSES:
Chas. Nida
C. Sedgwick
INVENTOR:
W. B. Padgett
W. J. Brock
BY
Munn & Co
ATTORNEYS.

UNITED STATES PATENT OFFICE.

WILLIAM B. PADGETT AND WILLIS J. BROCK, OF BATESVILLE, ARKANSAS.

WAGON-BRAKE.

SPECIFICATION forming part of Letters Patent No. 252,505, dated January 17, 1882.

Application filed November 8, 1881. (No model.)

*To all whom it may concern:*

Be it known that we, WILLIAM B. PADGETT and WILLIS J. BROCK, of Batesville, in the county of Independence and State of Arkansas, have invented a new and useful Improvement in Wagon-Brakes, of which the following is a full, clear, and exact description.

Reference is to be had to the accompanying drawings, forming a part of this specification, in which similar letters of reference indicate corresponding parts in all the figures.

Figure 1 is a plan view of our improvement, shown as applied to the running-gearing of a wagon. Fig. 2 is a sectional side elevation of the same, taken through the line $x\,x$, Fig. 1. Fig. 3 is a sectional side elevation of a part of the same, taken through the line $y\,y$, Fig. 1.

The object of this invention is to provide brakes constructed in such a manner that they will be applied to the vehicles automatically when the team ceases to draw, and that the power of the brakes can be increased and the brakes locked away from the wheels at the will of the driver.

The invention consists in the combination, with the hounds and brake-bar, of a stationary bar attached to the hounds, guide-rods connecting the two bars, and springs interposed between the said bars, whereby the brake will be applied by the tension of the said springs; also, in the combination, with the hounds, the double-tree, and the brake-bar, of the stationary cross bar, the guide-rods, and draw-rod connecting the two bars, the springs interposed between the said bars and the jointed connection rod or chain, whereby the brake will be applied automatically when the draft is stopped and will be withdrawn by the draft-strain; and, also, in the combination, with the brake-bars, the stationary cross-bar, the connecting-rods, and the springs, of pairs of links and a rock-shaft having arms and a lever, whereby the power of the brake can be regulated and the brake withdrawn from the wheels, as will be hereinafter fully described.

A represents the rear wheels, B the forward wheels, C the rear axle, D the forward axle, E the rear bolster, F the forward bolster, G the rear hounds, H the forward hounds, I the reach, J the tongue, and K the king-bolt, of an ordinary wagon.

To the forward part of the rear hounds, G, is firmly bolted a cross-bar, L, to the end parts of which are attached the forward ends of two guide-rods, M. The guide-rods M pass through the brake-bar N, and their rear ends are bent downward and are secured to the hounds G.

To the center of the brake-bar N is attached the rear end of a rod, O, which passes through the center of the stationary cross-bar L, and has a hook formed upon its forward end.

Upon the rods M O M are placed spiral springs P, the rear ends of which rest against the forward side of the brake-bar N. The forward ends of the springs P rest against the bar Q, placed at the rear side of the cross-bar L, and through which the rods M O M pass. With this construction the brake will be applied to the wheels A by the tension of the springs P.

Upon the hooked forward end of the rod O is hooked the rear end of a rod or long link, R, through the forward part of which the king-bolt K passes. To the forward end of the rod or link R is jointed the bend of a U-bar, S, the ends of which are hinged to the rear edge of the double-tree T by staples, eyebolts, or other suitable means. With this construction, when the team pulls upon the double-tree T the brake-bar N is drawn forward away from the wheels A and against the springs P, so that the draft will be applied to the said springs P and the cross-bar L, against which the said springs rest.

The rod or link R may be made in whole or in part as a chain, or may be provided with one or more links, U, to allow the wagon-gearing to be lengthened or shortened, as may be required.

To the rear side of the bar Q are hinged two links, V, and to the forward side of the brake-bar N are hinged two links, W. The links V W overlap each other in pairs, and through them are passed pins attached to the forked upper ends of the arms X. The lower ends of the arms X are rigidly attached to a shaft, Y, that rocks in bearings attached to the lower side of the hounds G.

To one end of the shaft Y is rigidly attached the lower end of a lever, Z, which is provided with a spring-pressed lever, *a*, to engage with a catch-plate, *b*, attached to the hounds G, to hold the said lever Z securely in any position into which it may be adjusted. With this construction, when the upper end of the lever Z is moved to the rearward the bar Q will be drawn to the rearward, putting the springs P under a greater tension and increasing the power of the brake. With this construction, also, when the upper end of the lever Z is moved forward the brake-bar N will be drawn forward, so that the wagon can be backed without applying the brake; and the brake can be locked in this position, when desired, by allowing the lever-catch *a* to engage with the catch-plate *b*.

Having thus described our invention, we claim as new and desire to secure by Letters Patent—

1. In a wagon-brake, the combination, with the hounds G and the brake-bar N, of the stationary bar L, the rods M O M, and the springs P, substantially as herein shown and described, whereby the brake will be applied by the tension of the said springs, as set forth.

2. In a wagon-brake, the combination, with the hounds G, the double-tree T, and brake-bar N, of the stationary cross-bar L, the guide-rods M, the draw-rod O, the springs P, and the jointed connection rod or chain R S, substantially as herein shown and described, whereby the brake will be applied automatically when the draft is stopped and will be withdrawn by the draft-strain, as set forth.

3. In a wagon-brake, the combination, with the brake-bar N, the stationary cross-bar L, the rods M O M, and the springs P, of the pairs of links V W and the rock-shaft Y, having arms X and lever Z, substantially as herein shown and described, whereby the power of the brake can be regulated and the brake withdrawn from the wheels, as set forth.

WILLIAM B. PADGETT.
WILLIS J. BROCK.

Witnesses:
M. A. WYCOUGH,
R. H. LEE.